(12) United States Patent
Farooq et al.

(10) Patent No.: US 7,250,472 B1
(45) Date of Patent: Jul. 31, 2007

(54) ACRYLIC COMPOSITIONS

(75) Inventors: Fareeduddin Farooq, Memphis, TN (US); James Leach, Drummonds, TN (US); Michael R. Turbeville, Memphis, TN (US); Andrew H. Janowicz, Cordova, TN (US); Richard D. Redfearn, Memphis, TN (US)

(73) Assignee: Lucite International, Inc., Cordova, TN (US)

( * ) Notice: Subject to any disclaimer, the term of this patent is extended or adjusted under 35 U.S.C. 154(b) by 0 days.

(21) Appl. No.: 10/490,355

(22) PCT Filed: Oct. 25, 1999

(86) PCT No.: PCT/US99/25133

§ 371 (c)(1),
(2), (4) Date: Apr. 15, 2005

(87) PCT Pub. No.: WO00/24825

PCT Pub. Date: May 4, 2000

Related U.S. Application Data

(60) Provisional application No. 60/105,645, filed on Oct. 26, 1998.

(51) Int. Cl.
*C08L 33/12* (2006.01)
(52) U.S. Cl. ........................ 525/228; 525/209; 525/224; 525/225; 525/226; 525/304; 525/305; 525/306; 525/307; 525/309
(58) Field of Classification Search ................ None
See application file for complete search history.

(56) References Cited

U.S. PATENT DOCUMENTS

| 5,415,931 A | 5/1995 | Minghetti et al. |
| 5,480,931 A | 1/1996 | Hock et al. |

*Primary Examiner*—David J. Buttner
(74) *Attorney, Agent, or Firm*—Jones Day

(57) ABSTRACT

Acrylic compositions which can be processed into thermoformable acrylic sheet material with variegated non-homogeneous granite appearance are disclosed. The acrylic compositions comprise a matrix of polymethyl methacrylate having dispersed within it particles of a thermoplastic such as polymethyl methacrylate and one or more comonomers wherein the thermoplastic is in the shape of thin wafers 0.05 to 9.53 mm thick, 0.18 to 12.8 wide and 0.18 to 7.62 mm long.

26 Claims, 2 Drawing Sheets

ACRYLIC COMPOSITIONS

CROSS REFERENCE TO RELATED APPLICATIONS

This application is the National Phase application of International Application No. PCT/US99/25133, filed Oct. 25, 1999, which designates the United States, and which further claims the benefit of U.S. Provisional Ser. No. 60/105,645, filed Oct. 26, 1998. These applications, in their entirety, are incorporated herein by reference.

FIELD OF INVENTION

The present invention is directed to an acrylic composition which can be processed into thermoformable acrylic sheet material with variegated non-homogeneous granite appearance and, more specifically, an acrylic composition comprising a matrix of polymethyl methacrylate having dispersed within it particles of a thermoplastic such as polymethyl methacrylate wherein the thermoplastic is in the shape of thin wafers 0.0.5 to 9.53 mm thick, 0.18 to 12.8 mm wide and 0.18 to 7.62 mm long and one or more comonomers.

BACKGROUND

Polymer products, particularly acrylic products, having a granite appearance and methods for their production are known in the art. Such products have found particular application in the spa and bathware industries. Success of acrylic sheet products having a granite appearance, such as Lucite® XL Natural Series Granite manufactured by the assignee of the inventors, in the spa and bath marketplaces has recently created a particular customer need for granite-like acrylic sheet products with variegated appearance. This is especially valuable in the marketplace if the desired variegated appearance is apparent after the acrylic sheet has been thermoformed into its final shape as a spa, bathtub or vanity bowl.

In general, known methods for the production of acrylic compositions to form acrylic sheet products having a granite appearance comprise the addition of various inorganic or organic particles or fillers to an acrylic solution or syrup. For example, U.S. Pat. Nos. 4,159,301 and 4,085,246 disclose a simulated granite material comprising a matrix of acrylic polymer and various opaque and translucent particles having specific optical densities. U.S. Pat. No. 5,304,592 discloses a simulated mineral article comprising a plastic material suspended within a thermoplastic matrix. The plastic material comprises both a thermoplastic and thermoset plastic and the matrix consists essentially of a thermoplastic material. U.S. Pat. No. 5,043,077 discloses a granite-like artificial stone comprising a matrix of radical-polymerizable monomers (containing methacrylate and an aromatic vinyl compound) and an inorganic filler, where the filler comprises radical-polymerizable monomers which may be the same or different than those used in the matrix. U.S. Pat. No. 4,959,401 discloses a composition suitable for making synthetic rock comprising an organic portion comprising one or more polymers and an inorganic filler portion comprising an oxide pigment, kaolin and a binder. However, each of these compositions have demonstrated difficulties in processing and later thermoforming.

In an attempt to advantageously affect the processing and thermoforming characteristics of the compositions suitable for forming granite-like products, U.S. Pat. Nos. 5,242,968, 5,415,931 and 5,530,041 provide an acrylic product having a matrix of polymethyl methacrylate containing preformed particles of polymethyl methacrylate. The preformed particles are preferably scrap material and comprise greater than 90% of polymethyl methacrylate and 1% of crosslinker, the remainder of the particles being comonomer.

The use of a polymeric material as the particulate or filler component of such compositions has been found to be preferred over the various fillers previously used. Such particles provide sufficient opacity to the composition for hiding and decorative purposes. However, care must be taken in formulating such compositions since the polymeric particles will swell due to the absorption of the matrix monomer to a volume that may be several times greater than their initial volume. The swelling of the particles will increase the viscosity of the composition and prevent the particles from settling.

Such compositions have been used in practice only with difficulty, as the size and swelling of the particles have not been heretofore optimized. In order to produce a material which is easily prepared, aesthetically pleasing and particularly suitable for further processing, the shape, size and swelling rate of the particles must be controlled and optimized. In conventional methods for preparing granite-appearing acrylic materials, such as that disclosed in the U.S. Pat. Nos. 5,242,968, 5,415,931 and 5,530,041 patents, the particles are often made from cell cast, continuous cast or extruded sheet material. These particles are often difficult to use as they either swell to an extent or at a rate which does not provide optimum results.

If the particles swell too much, the composition may absorb nearly all of the liquid or matrix phase, making its viscosity so great as to be unworkable. Alternatively, the particles may dissolve, losing their character altogether. If the particles do not swell to a sufficient degree, the mixture may not increase in viscosity sufficiently, allowing the particles to settle, thus detracting from the granite aesthetic. On the other hand, if the particles swell too slowly, the manufacturing process must be designed to accommodate a dynamic mixture which is constantly changing in viscosity or sufficient processing time must be allowed to allow the composition to reach equilibrium.

Accordingly, U.S. patent application Ser. No. 08/544,375 now U.S. Pat. No. 5,880,207 provides for acrylic compositions suitable for processing into a product having a granite appearance which are formulated to allow the processor to optimize the extent of particle swelling, the rate of particle swelling and the thermoforming properties of the final product, and a process for preparing such an acrylic composition.

However, to achieve the desired variegated appearance or effect, the particles need to have a certain morphology.

In the U.S. Pat. Nos. 5,242,968, 5,415,931 and 5,530,041 patents, the particles are not described as having any particular morphology, but only of a certain size which is predominantly from about 0.1 mm to about 2.0 mm. Optical microscopy measurements of the particles described in U.S. Pat. No. 5,880,207 reveal a predominantly spherical/cubical morphology. (Thickness, width and length are similar within each particle).

The conventional method of producing the predominantly spherical particles is grinding with an impact mill unit such as a Pallmann Pulverizer. Particle size distribution may be controlled by changing screen or sieve sizes. For example, a 30-60 mesh produces particles in the range of 0.2 to 0.6 mm in diameter. Formulations containing the spherical/cubical particles, however, tend to produce acrylic sheets with these particles positioning themselves more on the bottom side of the sheet when the matrix containing the particles is pumped onto a belt polymerizer.

The surface area of the spherical particle is such that they randomly orient themselves within the mixture of smaller spherical particles in the matrix, which results in the larger spherical particle sinking to the bottom of the matrix. Such settling of the larger spherical particles to the bottom also has the undesired effect of reducing sheet extension during thermoforming. A further limitation of the inclusion of spherical particles in the matrix is that they cannot be used in thin gauges of sheet, down to 0.06 inch.

It is an object of the present invention to provide a process for producing a new particle morphology, which will allow the particles to stay at the top of the acrylic matrix on the belt polymerizer and thereby produce a sheet with the desired variegated appearance instead of the normal "granite" look that is more homogeneous.

SUMMARY OF THE INVENTION

The present invention is directed to an acrylic composition comprising a matrix of polymethyl methacrylate homopolymer or copolymer having dispersed within it particles comprising 75 to 90 weight percent of a thermoplastic, preferably polymethyl methacrylate and preferably 10 to 25 weight percent of a comonomer comprising an ethylenically unsaturated monomer that copolymerizes with methylmethacrylate, wherein said particles further comprise more than 0.05 weight percent of a crosslinker and wherein the morphology of said particles is in the shape of thin wafers with particle sizes in the range of 0.18 to 12.8 mm wide, 0.18 to 76.2 mm long, and 0.05 to 9.53 mm thick.

The present invention is further directed to a process for preparing a thermoformed article comprising thermoforming a cured acrylic composition comprising a matrix of polymethyl methacrylate homopolymer or copolymer having dispersed within it particles comprising 75 to 90 weight percent of a thermoplastic preferably polymethyl methacrylate and preferably 10 to 25 weight percent of a comonomer comprising an ethylenically unsaturated monomer that copolymerizes with methylmethacrylate, wherein said particles comprise more than 0.05 weight percent of a crosslinker and wherein the morphology of said particles is in the shape of thin wafers with particle sizes in the range of 0.18 to 12.8 mm wide, 0.18 to 76.2 mm long, and 0.05 to 9.53 mm thick. Thermoformed products prepared from the composition or by the process are also within the scope of this invention.

DETAILED DESCRIPTION OF THE INVENTION

Figure 1:
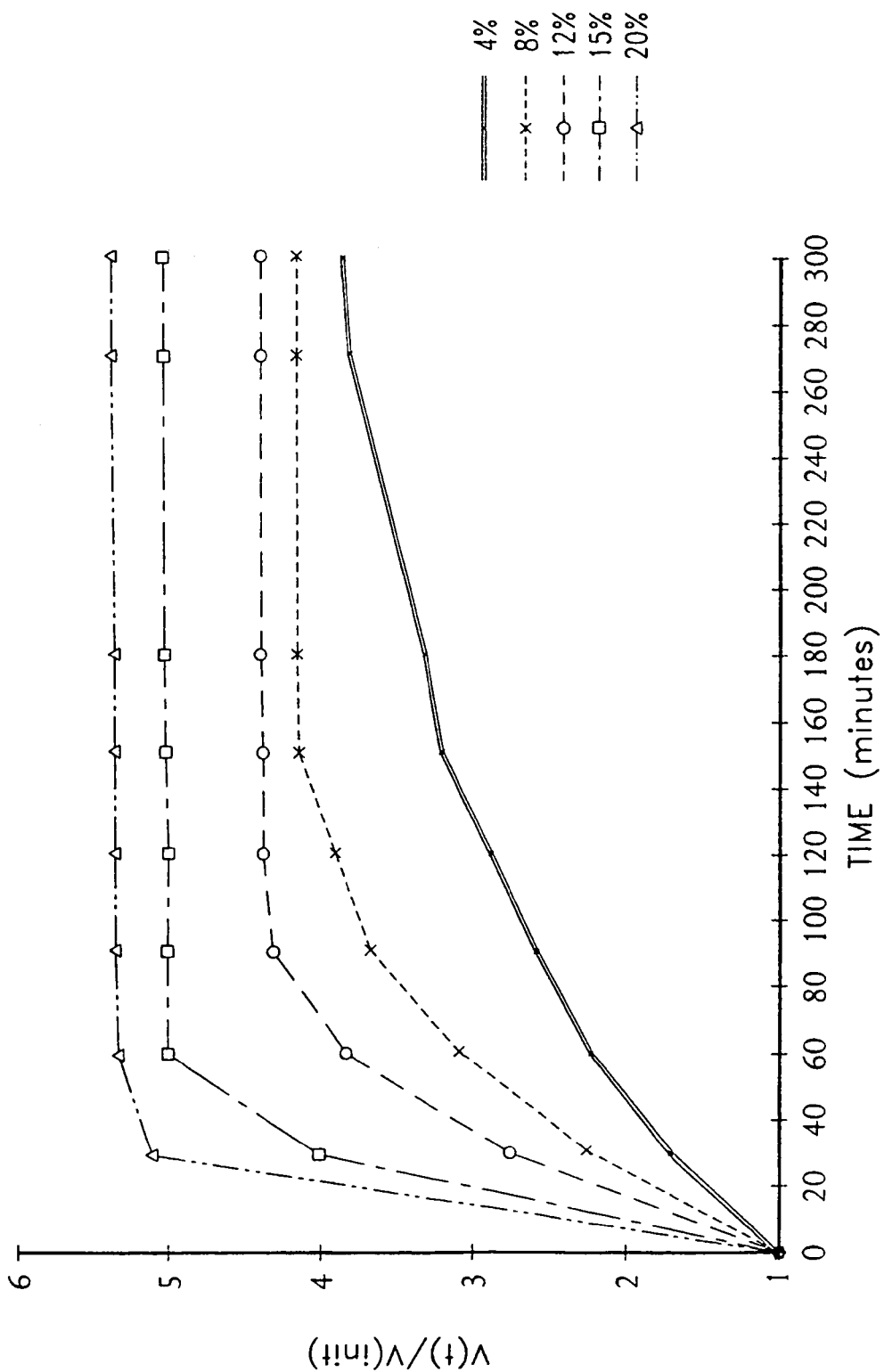
FIG. 1 is a graph showing the effect of comonomer concentration on the swelling and the swelling rate of the particles used in the present composition over time.

The polymethylmethacrylate (PMMA) homopolymer or copolymer matrix utilized in the present composition is prepared prior to the addition of the particles. As used herein PMMA refers to the homopolymer or copolymers of methyl methacrylate with greater than 50% by weight methyl methacrylate. The matrix is prepared by mixing a PMMA syrup which contains about 5 to 30% of PMMA solids with excess MMA monomer. PMMA syrup is prepared from standard MMA which is subjected to a conventional partial polymerization process as exemplified in U.S. Pat. No. 4,152,501, the disclosure of which is incorporated herein by reference. The MMA monomer is added to the syrup in a ratio of about 1:1 to about 1:5 and preferably about 1:3 (syrup:monomer). The MMA monomer may contain small amounts, specifically less than about 5%, of other comonomers, such as butyl acrylate and ethylene glycol dimethacrylate. The MMA monomer may further comprise additives such as initiators, e.g., organic peroxides; chain transfer agents, e.g., dodecylmercaptan; and colorants, e.g., titanium dioxide and carbon black.

The particles used in the present invention may be any thermoplastic which absorbs acrylic monomer and has a glass transition temperature greater than 50° C. and less than 205° C. These include ABS, PVC, ASA, PS, SAN, polycarbonate, nylon and polyester.

The particles contained within the polymethyl methacrylate matrix preferably comprise about 75 to about 90 weight percent of polymethyl methacrylate and greater than about 10 to about 25 weight percent of one or more comonomers comprising one or more ethylenically unsaturated monomers that are copolymerizable with methylmethacrylate. Other comonomers can be added to get the desired thermomechanical properties. These percentages and all other percentages disclosed herein are percent by weight of the total composition unless specifically noted. Preferably, the particles comprise about 80 to about 90 weight percent of polymethyl methacrylate and about 10 to about 20 weight percent weight of the comononers. Preferably, the comonomer is a lower alkyl acrylate or a lower alkyl methacrylate, having a carbon number of about $C_1$ to about $C_8$. Suitable comonomers include methyl acrylate, ethyl acrylate, butyl acrylate, propyl acrylate, isopropyl acrylate, t-butyl acrylate, isobutyl acrylate, 2-ethylhexyl acrylate, n-octyl acrylate, ethyl methacrylate, butyl methacrylate, propyl methacrylate, isopropyl methacrylate, t-butyl methacrylate, isobutyl methacrylate, 2-ethylhexyl methacrylate and n-octyl methacrylate. Most preferably the comonomer is methyl acrylate, ethyl acrylate or butyl acrylate.

The particles further comprise more than about 0.05 weight percent of a crosslinker. Preferably the particles comprise about 0.3 to about 1.5 and most preferably about 0.5 to about 1.0 weight percent of a crosslinker. Suitable crosslinkers are selected from the group consisting of allyl methacrylate, allyl acrylate, triallylphosphate, diallyl maleate, methallyl acrylate, vinyl methacrylate, divinyl benzene, ethylene glycol dimethacrylate, diethylene glycol dimethacrylate, triethylene glycol dimethacrylate and mixtures thereof. A preferred crosslinker for use in the present invention is ethylene glycol dimethacrylate (EGDMA).

The extent of the swelling and the swelling rate of the particles prepared for use in the present acrylic compositions is affected both by the amount of comonomer contained in the particles, as well as the amount of crosslinker contained in the particles.

In general, the amount of crosslinker utilized has a more pronounced effect on the extent of swelling than the rate of swelling of the particles. As the amount of crosslinker is increased, smaller swollen particles will be obtained.

However, these beneficial effects of the crosslinker utilized in the present particles are tempered by the fact that the particles become harder and less thermoformable as the amount of crosslinker is increased. This can be controlled and optimized however, by changing the amount of comonomer contained in the particles.

As can be seen in FIG. 1, at a comonomer content of 4 and 8%, the particles remain relatively small. Moreover, the particles take a relatively long period of time to reach swelling equilibrium at these concentrations of comonomer. Conversely, as the comonomer concentration within the particles is increased to 12%, 15% and 20%, the swollen particles become larger and reach equilibrium at a much faster rate. Furthermore, an increase in the amount of comonomer within the particles softens the particles and causes them to be more highly thermoformable. It is this balance between the amount of crosslinker and the amount of comonomer which provides the ability to design the acrylic composition in such a manner so that its processing and thermoforming capabilities are optimized.

The particles useful in the present compositions should have a degree of crosslinking sufficient to provide an extractables fraction of about 5 to about 25 percent and preferably about 14 to about 20 percent when measured by ASTM D2765. However, since the polymer is made by bulk polymerization directly from monomer in the presence of relatively large amount of crosslinker, it is more highly branched than similar extractables from conventional continuous cast sheet. This can be shown by GPC viscometry.

Approximately 5 to 80% of the particles should generally have a particle size which will allow them to pass through a 3.5 to 20 mesh standard U.S. wire cloth sieve or about 800 microns in the smallest dimension. Preferably these particular particle sizes, or flakes, will have a particle size between about 800 to 5660 microns.

When exposed to the monomer rich matrix, these particles will typically swell to about five times their volume in the dry state. Consequently, the particles may swell to a size of up to 30 mm when mixed with the matrix material.

If color and increased opacity is desired in the final sheet product, various colorants or fillers may be added to the particles during their formation. Suitable colorants include pigments and dyes such as carbon black and titanium dioxide. The colorants may be used in amounts of up to about 10% by weight of the dry particles and preferably about 0.1 to 7.0 percent by weight of the dry particles.

The particles utilized in the present compositions may be prepared by any suitable process known to those skilled in the art. However, it is preferred that the particles be prepared by a conventional bulk polymerization process.

Figure 2:
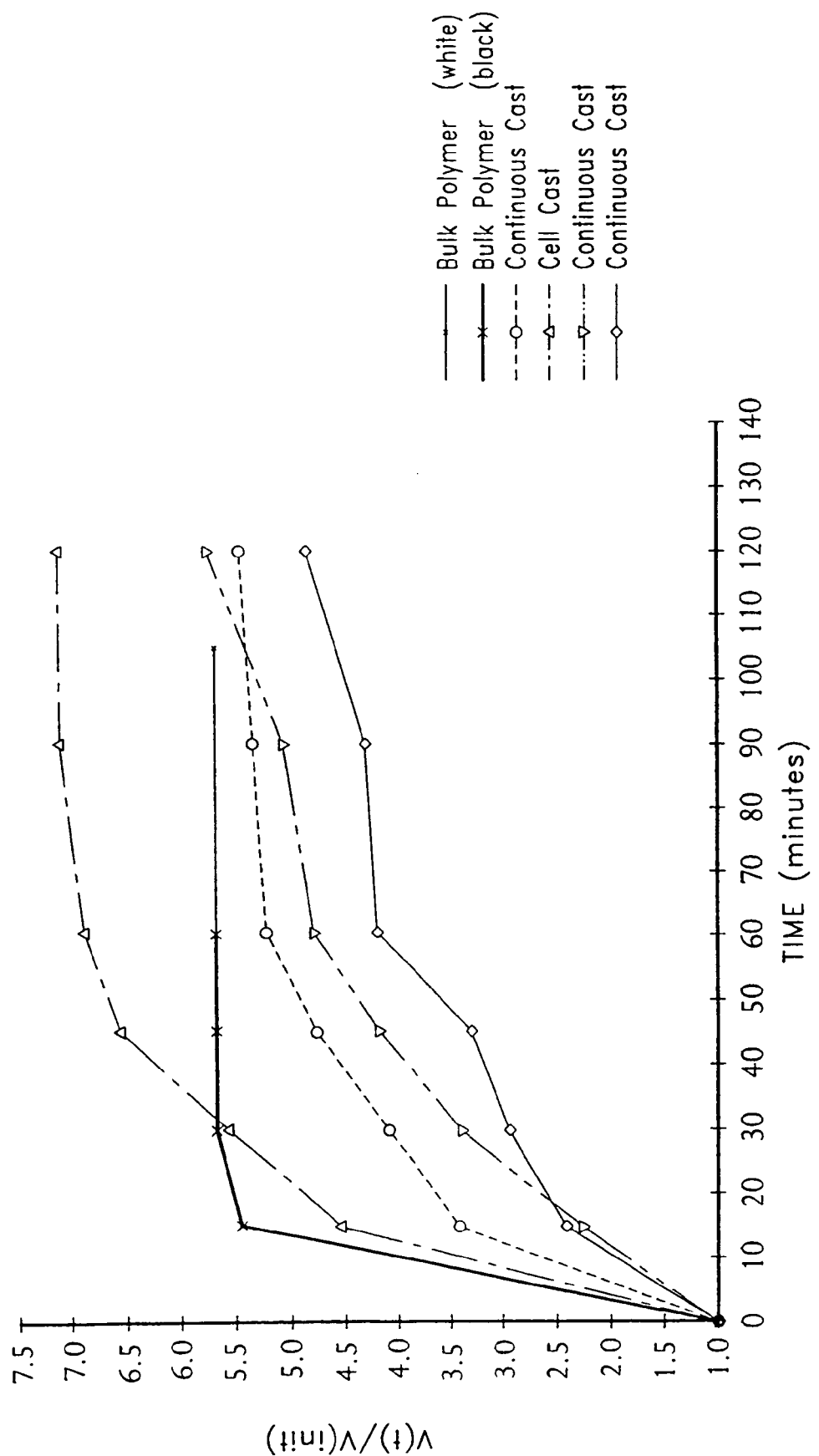
FIG. 2 is a graph comparing the swelling rate and extent of swelling of the particles used in the present composition versus particles prepared from sheet made by different processes.

FIG. 2 shows the superior performance of particles prepared by a bulk polymerization process as in accordance with the present invention in comparison to particles prepared from sheet made by other processes. In FIG. 2, the particles prepared from the bulk polymerization process swell faster than particles prepared from sheet made with a continuous cast process and sheet made with a cell cast process. This makes processing faster and more efficient. Thus, bulk polymerized particles are superior in performance in comparison to particles made from other processes.

A typical bulk polymerization process suitable for use with the present invention is described in the *Encyclopedia of Polymer Science and Engineering*, Vol. 2, (1985) at p 500, the disclosure of which is incorporated herein by reference.

Large particles or flakes may be generated from the resultant polymer by clamping it in the carriage of a Northwood model L20 planer operating at a feed rate of 12-20 ft. per minute. The depth of cut is adjusted to obtain the desired thickness of flakes. The flakes may then be sieved with a standard wirecloth sieve as will be recognized by those skilled in the art.

The flakes are generally in the shape of thin wafers, with sizes ranging from 0.002 in to 0.375 in thick, 0.007 in to 0.50 in wide and 0.007 to 3.0 long.

In terms of surface area to mass ratio, the flakes prepared by a bulk polymerization process as in accordance with the present invention revealed approximately five times the surface area to mass (mm2/mg) in comparison to the predominantly spherical or bucial particles prepared by other processes, including the one in U.S. Pat. No. 5,880,207.

The present acrylic compositions comprise about 5 to about 20 weight percent and preferably about 10 to about 14 weight percent of the particles and about 95 to about 80 weight percent and preferably about 90 to about 86 weight percent of the matrix material. The remainder of the composition comprises additives, adjuvants and colorants as discussed below.

The present acrylic compositions may further comprise additives suitable to provide color(s) as needed for a particular application. Preferred colorants are dyes or pigments such as carbon black and titanium dioxide. Suitable colorants are added to the composition in amounts of up to about 10 weight percent and preferably about 0.1 to about 7.0 weight percent of the total composition.

Other auxiliary materials and adjuvants conventionally used in the art may be added to the present compositions (in the matrix) as needed for a particular application. Examples of such adjuvants or auxiliary materials are initiators, such as t-butyl peroxy neodecanoate and surfactants, such as sodium dilaurylsulfosuccinate.

The acrylic compositions of the present invention are prepared by mixing the particles with the polymethyl methacrylate homopolymer or copolymer which will form the matrix of the composition and any additional materials as necessary for a particular application. The materials can be mixed in any suitable manner as will be evident to one skilled in the art. Preferably, the materials are mixed at room temperature for about 15 to 30 minutes. The compositions are then cured by any suitable procedure (including continuous casting and cell casting) which will be evident to those skilled in the art. However, a preferred means for curing the material consists of allowing the mixture to stand at about 82° C. for about 20 minutes and then at about 125° C. for about 7 minutes.

After curing, the acrylic composition has flakes apparent to the naked eye on the top side of the sheet which will be masked with a suitable film masking. The sheet may then be thermoformed, by means of suitable thermoforming processes well known in the art, with the masked side facing up.

After curing, the acrylic compositions may then be used to prepare articles such as spas and bathware by thermoforming. Suitable thermoforming processes are well known in the art and the present invention is not limited to any one type of thermoforming process.

The present invention will now be illustrated by reference to the following specific, non-limiting examples.

EXAMPLES

Example 1

Particle Production

White polymer particles were prepared using a bulk polymerization process. The following ingredients were used for the particles.

| White Particles | Weight (grams-amend) |
| --- | --- |
| methyl methacrylate | 2365.72 |
| n-butyl acrylate | 180.00 |
| ethyl acrylate | 240.00 |
| ethylene glycol dimethacrylate | 18.0 |
| dodecyl mercaptan | 14.0 |
| TINUVIN ®-P | 0.30 |
| AEROSOL ® OT | 0.23 |
| LAUROX ® | 1.65 |
| t-butyl peroxyacetate | 0.10 |
| 50% dispersion of Titanium dioxide in methyl methacrylate | 180.00 |
| monomethyl ether of hydroquinone | 0.03 |

TINUVIN-P® is a UV stabilizer available from Ciba-Geigy.

AEROSOL® OT is a surfactant available from Witco Chemical.

LAUROX® is a solution of lauroyl peroxide available from Witco Chemical.

The ingredients were mixed in a one gallon disposable plastic bottle. The mixture had a viscosity of approximately 1 cP as measured with a Brookfield RVTDV-11 Viscometer. The mixture was then degassed under 23 inches of vacuum with a water aspirator in a 2000 ml vacuum flask. After degassing, the mixture was transferred to a 2 mil thick nylon bag and sealed.

The nylon bag and its contents were then placed in a Fisher Class 86A Safety Oven and taken through the heating steps set forth in Table 1.

TABLE 1

| Temperature (° C.) | Duration (mins) |
| --- | --- |
| Ambient to 61 | 30 |
| hold at 61 | 60 |
| 61 to 56 | 5 |
| hold at 56 | 900 |
| 56 to 75 | 5 |
| hold at 75 | 60 |
| 75 to 100 | 5 |
| hold at 100 | 60 |
| 100 to 130 | 5 |
| hold at 130 | 120 |
| 130 to ambient | 30 |

After cooling to ambient temperature, the bag was removed and discarded. Flakes were generated from the resultant polymer by clamping it in the carriage of a Northwood model L20 planer and operating at a feed rate of 12-20 ft. per minute. The depth of cut was adjusted to obtain thickness of flakes from 0.002 to 0.06 inches. The flakes were sieved with a standard wirecloth sieve. Sieve fraction between 1680 and 2380 microns (>8<12) was isolated.

Acrylic Sheet Production

The white polymer flakes and other pulverized polymer fractions were mixed as follows:

| | |
| --- | --- |
| white flakes (>8 < 12) | 17.5 grams |
| white particles(>12 <20) | 2.5 grams |
| white particles(>40 <50) | 11.0 grams |
| blue particles(>40 <50) | 15.3 grams |
| black particles(>40 <50) | 1.4 grams |
| brown particles(>20 <30) | 2.5 grams |

11 grams of the polymer particle mixture was mixed with the ingredients necessary to form the matrix set forth below:

| | Weight (grams) |
| --- | --- |
| ethylene glycol dimethacrylate | 0.23 |
| dodecyl mercaptan | 0.18 |
| syrup of partially polymerized MMA | 41.88 |
| n butyl acrylate | 1.61 |
| methyl methacrylate | 44.6 |
| t-butyl peroxy neodecanoate | 0.45 |
| Vazo ® 64 | 0.03 |
| Tinuvin ®-P | 0.01 |
| Aerosol ®-OT | 0.02 |
| monomethyl ether of hydroquinone | 0.002 |

These ingredients were mixed for 30 minutes in a glass bottle at a temperature of 20° C. After mixing, the slurry was degassed in a 250 ml flask under 27 in. of vacuum and then poured into a glass cell. The mixture was allowed to polymerize at 82° C. for 20 minutes and then at 125° C. for 7 minutes. The material was then allowed to cool to ambient temperature. After cooling, a smooth, high gloss, void free plaque was obtained. The plaque had the appearance of natural material.

Example 2

Particle Production

Green polymer particles were prepared using a bulk polymerization process. The following ingredients were used for making the green particles.

| Green Particles | Weight (grams-amend) |
| --- | --- |
| methyl methacrylate | 2398.67 |
| n-butyl acrylate | 450.00 |
| ethylene glycol dimethacrylate | 15.00 |
| dodecyl mercaptan | 14.01 |
| TINUVIN ®-P | 0.30 |
| AEROSOL ® OT | 0.26 |
| LAUROX ® | 1.50 |
| t-butyl peroxyacetate | 0.17 |
| Phthalo-cyanine green dispersion in methyl methacrylate | 120.00 |
| monomethyl ether of hydroquinone | 0.03 |

TINUVIN-P® is a UV stabilizer available from Ciba-Geigy.

AEROSOL® OT is a surfactant available from Witco Chemical.

LAUROX® is an initiator available from Witco Chemical.

The ingredients were mixed in a one gallon disposable plastic bottle. The mixture had a viscosity of approximately 1 cP as measured with a Brookfield RVTDV-11 Viscometer. The mixture was then degassed under 23 inches of vacuum with a water aspirator in a 2000 ml vacuum flask. After degassing, the mixture was transferred to a 2 mil thick nylon bag and sealed.

The nylon bag and its contents were then placed in a Fisher Class 86A Safety Oven and taken through the heating steps set forth in Table 2.

TABLE 2

| Temperature (° C.) | Duration (mins) |
|---|---|
| Ambient to 58 | 30 |
| hold at 58 | 990 |
| 58 to 62 | 5 |
| hold at 62 | 295 |
| 62 to 90 | 5 |
| hold at 90 | 115 |
| 90 to 130 | 5 |
| hold at 130 | 115 |
| 130 to ambient | 30 |

After cooling to ambient temperature, the bag was removed and discarded. Flakes were generated from the resultant polymer by clamping it in the carriage of a Northwood model L20 planer and operating at a feed rate of 12-20 ft. per minute. The depth of cut was adjusted to obtain thickness of flakes from 0.04 to 0.08 inches. The flakes were sieved with a standard wire cloth sieve. Sieve fraction between 1680 and 2380 microns (>8<12) was isolated.

Acrylic Sheet Production

The green polymer flakes and other pulverized polymer fractions were mixed as follows:

| | |
|---|---|
| green flakes (>8 < 12) | 13.98 grams |
| green particles(>20 <30) | 1.75 grams |
| green particles(>40 <50) | 10.00 grams |
| white particles(>10 <20) | 7.50 grams |
| white particles(>20 <30) | 1.51 grams |
| white particles(>40 <50) | 4.00 grams |
| black particles(>10 <20) | 3.51 grams |
| black particles(>20 <30) | 1.75 grams |
| black particles(>40 <50) | 6.00 grams |

11 grams of the polymer-particle mixture was mixed with the ingredients necessary to form the matrix set forth below:

| | Weight (grams) |
|---|---|
| ethylene glycol dimethacrylate | 0.23 |
| dodecyl mercaptan | 0.20 |
| syrup of partially polymerized MMA | 43.448 |
| n butyl acrylate | 3.01 |
| methyl methacrylate | 41.59 |
| t-butyl peroxy neodecanoate | 0.45 |
| Vazo ® 64 | 0.04 |
| Tinuvin ®-P | 0.01 |
| Aerosol ®-OT | 0.02 |
| monomethyl ether of hydroquinone | 0.002 |

These ingredients were mixed for 30 minutes in a glass bottle at a temperature of 20° C. After mixing, the slurry was degassed in a 250 ml flask under 27 in. of vacuum and then poured into a glass cell. The mixture was allowed to polymerize at 82° C. for 20 minutes and then at 125° C. for 7 minutes. The material was then allowed to cool to ambient temperature. After cooling, a smooth, high gloss, void free plaque was obtained. The plaque had the appearance of natural material.

Although illustrated and described herein with reference to certain specific embodiments, the present invention is nevertheless not intended to be limited to the details shown. Rather, various modifications may be made in the details within the scope and range of the equivalents of the claims and without departing from the spirit of the invention.

What is claimed is:

1. An acrylic composition comprising a matrix of polymethyl methacrylate having dispersed within it particles of a thermoplastic wherein the morphology of said particles resembles thin wafers in shape with sizes in the range of from 0.18 to 12.8 mm wide, from 0.18 to 7.62 mm long, and from 0.05 to 9.53 mm thick.

2. An acrylic composition comprising a matrix of polymethyl methacrylate having dispersed within it particles comprising 75 to 90 weight percent polymethyl methacrylate and a comonomer comprising an ethylenically unsaturated monomer that copolymerizes with methylmethacrylate, wherein said particles comprise more than 0.05 weight percent of a crosslinker and the morphology of said particles resembles thin wafers in shape with sizes in the range of 0.18 to 12.8 mm wide, 0.18 to 76.2 mm long, and 0.05 to 9.53 mm thick.

3. An acrylic composition as in claim 2, wherein said particles contain 10 to 25 weight percent of said comonomer.

4. An acrylic composition comprising a matrix of polymethyl methacrylate having dispersed within it particles comprising greater than 90 weight percent polymethyl methacrylate and a comonomer comprising an ethylenically unsaturated monomer that copolymerizes with methylmethacrylate, wherein said particles comprise more than 0.05 weight percent of a crosslinker and the morphology of said particles resembles thin wafers in shape with sizes in the range of 0.18 to 12.8 mm wide, 0.18 to 76.2 mm long, and 0.05 to 9.53 mm thick.

5. An acrylic composition as in claim 4, wherein said particles contain up to 10 weight percent of said comonomer.

6. An acrylic composition as in claim 2 or 4, wherein said comonomer is selected from the group consisting of methyl acrylate, ethyl acrylate, butyl acrylate, propyl acrylate, isopropyl acrylate, t-butyl acrylate, isobutyl acrylate 2-ethylhexyl methacrylate and n-octyl methacrylate, ethyl methacrylate, butyl methacrylate, propyl methacrylate, isopropyl methacrylate, t-butyl methacrylate and isobutyl methacrylate.

7. An acrylic composition as in claim 6, wherein said comonomer is selected from the group consisting of methyl acrylate, butyl acrylate and ethyl acrylate.

8. An acrylic composition as in claim 2 or 4, wherein said crosslinker is selected from the group consisting of allyl methacrylate, allyl acrylate, triallyl phosphate, diallyl maleate, methallyl acrylate, vinyl methacrylate, divinyl benzene, ethylene glycol dimethacrylate, diethylene glycol dimethacrylate, triethylene glycol dimethacrylate and mixtures thereof.

9. An acrylic composition as in claim 8, wherein said crosslinker is ethylene glycol dimethacrylate.

10. An acrylic composition as in claim 2 or 4, wherein said crosslinker is used in an amount of 0.3 to 1.5 weight percent.

11. An acrylic composition as in claim 10, wherein said crosslinker is used in an amount of 0.5 to 1.0 weight percent.

12. An acrylic composition as in claim 2 or 4, wherein said particles have a particle size of 800 to 5660 microns.

13. A thermoformed article prepared from a composition as claimed in claim 1.

14. A method for preparing an article comprising thermoforming a cured acrylic composition comprising a matrix of polymethyl methacrylate having dispersed within it particles of a thermoplastic wherein the morphology of said particles resembles thin wafers in shape with sizes in the range of from 0.18 to 12.8 mm wide, from 0.18 to 76.2 mm long, and from 0.05 to 9.53 mm thick.

15. A method for preparing an article comprising thermoforming a cured acrylic composition comprising a matrix of polymethyl methacrylate having dispersed within it particles comprising 75 to 90 weight percent polymethyl methacrylate and a comonomer comprising an ethylenically unsaturated monomer that copolymerizes with methyl methacrylate, wherein said particles comprise more than 0.05 weight percent of a crosslinker and the morphology of said particles resembles thin wafers in shape with sizes in the range of 0.18 to 12.8 mm wide, 0.18 to 76.2 mm long, and 0.05 to 9.53 mm thick.

16. A method as in claim 15, wherein said particles contain 10 to 25 weight percent of said comonomer.

17. A method for preparing an article comprising thermoforming a cured acrylic composition comprising a matrix of polymethyl methacrylate having dispersed within it particles comprising greater than 90 weight percent polymethyl methacrylate and a comonomer comprising an ethylenically unsaturated monomer that copolymerizes with methyl methacrylate, wherein said particles comprise more than 0.05 weight percent of a crosslinker and the morphology of said particles resembles thin wafers in shape with sizes in the range of 0.18 to 12.8 mm wide, 0.18 to 76.2 mm long, and 0.05 to 9.53 mm thick.

18. A method as in claim 17 wherein said particles contain up to 10 weight percent of said comonomer.

19. A method as in claim 15 or 17, wherein said comonomer is selected from the group consisting of methyl acrylate ethyl acrylate, butyl acrylate propyl acrylate, isopropyl acrylate, t-butyl acrylate, isobutyl acrylate 2-ethylhexyl acrylate n-octyl acrylate, ethyl methacrylate, butyl methacrylate, propyl methacrylate, isopropyl methacrylate, t-butyl methacrylate and isobutyl methacrylate, 2-ethylhexyl methacrylate and n-octyl methacrylate.

20. A method as in claim 19, wherein said comonomer is selected from the group consisting of butyl acrylate and ethyl acrylate.

21. A method as in claim 15 or 17, wherein said crosslinker is selected from the group consisting of allyl methacrylate, allyl acrylate, triallyl phosphate, diallyl maleate, methallyl acrylate, vinyl methacrylate, divinyl benzene, ethylene glycol dimethacrylate, triethylene glycol dimethacrylate and mixtures thereof.

22. A method as in claim 15 or 17, wherein said crosslinker is ethylene glycol dimethacrylate.

23. A method as in claim 15 or 17, wherein said crosslinker is used in amount of 0.3 to 1.5 weight percent.

24. A method as in claim 23, wherein said crosslinker is used in an amount of 0.5 to 1.0 weight percent.

25. A method as in claim 15 or 17, wherein said particles have a particle size of 800 to 5660 microns.

26. A thermoformed article prepared by the method of claim 14.

* * * * *

UNITED STATES PATENT AND TRADEMARK OFFICE
CERTIFICATE OF CORRECTION

PATENT NO. : 7,250,472 B1  Page 1 of 1
APPLICATION NO. : 10/490355
DATED : July 31, 2007
INVENTOR(S) : Farooq et al.

It is certified that error appears in the above-identified patent and that said Letters Patent is hereby corrected as shown below:

In claim 2 at column no. 10 at line no. 28, delete "0.18 to 76.2 mm long" and insert --0.18 to 7.62 mm long--.

In claim 4 at column no. 10 at line no. 41, delete "0.18 to 76.2 mm long" and insert --0.18 to 7.62 mm long--.

In claim 14 at column no. 11 at line no. 12, delete "0.18 to 76.2 mm long" and insert --0.18 to 7.62 mm long--.

In claim 15 at column no. 11 at line no. 23, delete "0.18 to 76.2 mm long" and insert --0.18 to 7.62 mm long--.

In claim 17 at column no. 12 at line no. 2, delete "0.18 to 76.2 mm long" and insert --0.18 to 7.62 mm long--.

Signed and Sealed this

Twenty-sixth Day of August, 2008

JON W. DUDAS
*Director of the United States Patent and Trademark Office*